United States Patent [19]
Gratton et al.

[11] Patent Number: 5,411,450
[45] Date of Patent: May 2, 1995

[54] TRANSIT CLUTCHLESS SHIFTING OF AN AUXILIARY TRANSMISSION

[75] Inventors: Andrew B. Gratton; Anthony A. Bachhuber; LeRoy A. Maxfield, all of Oshkosh; Jeffrey M. Miller, Larsen, all of Wis.

[73] Assignee: Oshkosh Truck Corporation, Oshkosh, Wis.

[21] Appl. No.: 41,253

[22] Filed: Apr. 1, 1993

[51] Int. Cl.6 ............................................. F16H 61/04
[52] U.S. Cl. ...................................... 477/124; 74/335
[58] Field of Search .................... 74/335; 477/124, 125

[56] References Cited

U.S. PATENT DOCUMENTS

| | | | |
|---|---|---|---|
| 3,626,777 | 12/1971 | Langenbeck | 74/333 |
| 4,527,447 | 7/1985 | Richards | 477/124 |
| 4,603,596 | 8/1986 | Akashi et al. | 477/124 |
| 4,723,727 | 2/1988 | Weber | 74/333 |
| 4,959,806 | 9/1990 | Gold . | |
| 4,991,099 | 2/1991 | Markyvech et al. . | |

Primary Examiner—John T. Kwon
Attorney, Agent, or Firm—Baker & McKenzie

[57] ABSTRACT

A system for shifting gears in an auxiliary transmission is provided. The system enables shifting between gears of an auxiliary transmission without stopping the vehicle and without requiring a clutch between drive-line components. The system is activated by the operator while the vehicle is moving and includes safety features that preclude downshifting when the vehicle is traveling above a predetermined speed. The system is fully compatible with automatic main transmissions. An electronic control system monitors the rotational velocities or frequencies of the input and output shafts for clutchless shifting while the vehicle is moving.

11 Claims, 10 Drawing Sheets

TRANSIT CLUTCHLESS SHIFTING OF AN AUXILIARY TRANSMISSION

FIELD OF THE INVENTION

This invention relates generally to the shifting of a multi-speed gearcase without using a clutch between major drive-line components and while the vehicle is moving. The invention relates to the shifting of an auxiliary transmission of a vehicle that includes an automatic main transmission. The invention does not require or use any operator controlled clutch.

BACKGROUND OF THE INVENTION

Many heavy duty on-off road vehicles include an auxiliary transmission in addition to the main transmission. Two related problems are associated with auxiliary transmissions that are used in combination with automatic main transmissions. First, because a vehicle equipped with an automatic main transmission does not have a clutch between major drive-line components, the operator must stop the vehicle in order to shift the auxiliary transmission from low to high or from high to low. Second, because the operator must stop the vehicle in order to shift the auxiliary transmission, an auxiliary transmission is not considered ideal with an automatic main transmission in many applications.

For example, if the operator desires to switch from high to low while ascending a steep, muddy grade, the vehicle may very well become immobile in the mud while the operator is shifting. If the vehicle is an emergency vehicle such as an aircraft rescue and fire fighting vehicle (ARFF), it may be dangerous for the operator to completely stop the vehicle to shift the auxiliary transmission. Finally, for obvious reasons, it may be very undesirable for the operator of a military vehicle to completely stop the vehicle in order to shift the auxiliary transmission, whether in a convoy or battlefield situation.

Auxiliary transmissions are often used with heavy equipment vehicles used in both on-road and off-road conditions. While auxiliary transmissions are supplied in heavy trucks, they have also been implemented in recreational off-road vehicles having four-wheel drive. Specifically, the low gear of an auxiliary transmission is especially useful when the recreational vehicle is towing a boat or a trailer up a steep hill or in muddy conditions. Further, the low gear is an important safety device when descending down steep hills in both on-road and off-road situations.

Two-speed auxiliary transmissions include low and high gears. Other auxiliary transmissions may include more than two gears. When the auxiliary transmission is in low gear, the top speed of the vehicle is dependent on the gear ratio and is normally limited to about 20 miles per hour even though the main transmission is in high gear.

Thus, there is a need for an improved shifting system for auxiliary transmissions. The shifting system must be able to shift the auxiliary transmission without use of a clutch so it may be used in combination with a fully automatic main transmission. The system should be applicable to all vehicles employing auxiliary transmissions with multi-speed gearcases and vehicles with or without fully automatic main transmissions.

SUMMARY OF THE INVENTION

The present invention makes a significant contribution to the auxiliary transmission art by providing an improved shifting system that enables the vehicle operator to shift a multi-speed auxiliary transmission from a low to a high gear or vice versa without stopping the vehicle. Further, the system of the present invention may be employed with fully automatic main transmissions because a drive-line clutch is not required to shift between gears of the auxiliary transmission.

The improved system provided of the present invention includes two signal generators, or sensors, one measuring the rotational velocity or frequency of the input shaft, the other measuring the rotational velocity or frequency of the output shaft. A means for shifting the shift collar from any gear to the neutral position and then from the neutral position to any gear is provided in the form of an actuator mechanism. The actuator mechanism may be either electric or air. A controller, or control means, compares the rotational velocities of the input and output shafts as provided by the signal generators and either allows the throttle to be activated by the operator or deactivates the throttle depending on whether the rotational velocity of the input shaft needs to be increased or decreased.

The control means ensures that the input and output shafts are rotating at substantially equal velocities, or ensures that the input and output shafts are "in sync" before it activates the shifting actuator. Therefore, the control means eliminates the need for an in-line clutch to slow down input and output shafts before shifting.

Once the operator makes the decision to shift the gears of the auxiliary transmission, the operator engages a switch on a control panel of the vehicle. After engaging the switch, the operator fully depresses the throttle. The control means compares the rotational velocities of the input and output shafts as provided by the signal generators. If the rotational velocity of the input shaft is less than the rotational velocity of the output shaft, the control means effectively waits for the rotational velocity of the input shaft to increase as the throttle is being fully depressed by the operator. Or, on the other hand, if the rotational velocity of the input shaft is greater than the rotational velocity of the output shaft, the control means effectively deactivates the throttle and waits for the rotational velocity of the input shaft to decrease until it is substantially equal to the rotational velocity of the output shaft.

The control means either waits for the rotational velocity of the input shaft to increase as a result of the operator fully depressing the throttle, or, the control means deactivates the throttle despite its being depressed by the operator and waits for the rotational velocity of the input shaft to decrease until it substantially equals the rotational velocity of the output shaft. Thus, the control means includes a means to allow the continued operation of the throttle by the operator and the control means further includes a means for deactivating the throttle despite its being fully depressed by the operator. An alternative embodiment within the scope of this invention would include a control means that can both increase and decrease the throttle.

The control means also includes a limit means which prevents the shifting of the shift collar out of a high gear and into the neutral position when the rotational velocity of the output shaft is above a predetermined value. This is a safety feature which does not allow the system to downshift when the vehicle is going too fast despite the fact that the operator desires to downshift and, in fact, pushed the switch. At a higher speed, the rotational velocity of the input shaft cannot be increased enough to substantially equal the rotational velocity of the output shaft. An attempt to downshift under these conditions would present a dangerous situation where the shift collar could be shifted from a higher gear into the neutral position and the operator would be unable to downshift into a lower gear. The vehicle could be stuck in neutral and create a runaway vehicle situation. If the control means shifts the actuator from high to neutral and the vehicle then increases speed above the limit (20 mph) for achieving low range, the system overrides the downshift command, turns on an alarm, and reverts to the high range shift sequence thereby allowing the auxiliary transmission to get back into high gear and preventing a runaway truck.

In the preferred embodiment of the present invention, the system includes an alarm to notify the operator when the rotational velocity of the output shaft is above the prescribed preset value for achieving low range. The auxiliary transmission is shifted by shifting the shift collar from one gear, into the neutral position, and then into the chosen gear. Therefore, the limit means prevents the shift collar from being shifted from a gear and into the neutral position when the speed of the vehicle is too high.

The control means of the preferred system also includes a means for disengaging the forward clutch of the main transmission. In order to move the shift collar from a gear into the neutral position, the torque on the drive-line must be removed. The preferred method to relieve drive-line torque is by disengaging the forward clutch of the main automatic transmission. Therefore, the control means should preferably include a means to disengage the forward clutch of a main transmission prior to shifting the shift collar from a low gear into the neutral position during an upshift and from a high gear into the neutral position during a downshift. This can be done via electronic means on an electronic transmission and via electromechanical means on a non-electronic transmission.

As noted above, the preferred system includes a control panel accessible by the operator. The control panel includes an auxiliary gear selection switch, an on/off switch and indicator lights to indicate the position of the shift collar of the auxiliary transmission. Limit switches are also preferably disposed by each gear. The limit switch can only be activated when the corresponding gear splines are fully engaged by the shift collar. Once the shift collar fully engages its corresponding gear splines, then the activated limit switch sends a signal to the control panel to illuminate the indicator light which tells the operator that the chosen gear has been fully engaged by the shift collar.

The present invention also lends itself to an improved method of shifting between two gears of a multi-speed auxiliary transmission of a vehicle while the vehicle is moving. The operator, while driving the vehicle, chooses to shift the auxiliary transmission from a low gear to a high gear. The operator throws the switch on the control panel and thereafter fully depresses the throttle. The control means activates the actuator to push the shift collar towards the neutral position from its position on the first gear. In order to successfully get the shift collar off the low gear and into neutral, the control means sends a signal to the main transmission to release the forward clutch. After the forward clutch is released, the shift collar, under pressure from the actuator, is pushed into the neutral position. Also, at the same time, the control means deactivates the engine throttle to reduce the engine speed. Despite the throttle being deactivated, the operator maintains the throttle pedal in a fully depressed position. The control means then sends a signal to the main transmission to reengage the forward clutch. Meanwhile, the control means has been receiving signals from the signal generators disposed at the input and output shafts and has determined the difference between the rotational velocities of the input and output shafts.

If the rotational velocity of the output shaft is greater than the input shaft (i.e., in the case of a downshift), the control means reactivates the throttle, which is still depressed by the operator, to increase the rotational velocity of the input shaft until the rotational velocity of the input shaft approximately equals the rotational velocity of the output shaft. In the alternative, if the rotational velocity of the output shaft is less than the input shaft (i.e., in the case of an upshift) the control means waits until the input shaft velocity is reduced until it substantially equals the output shaft velocity.

When the control means has determined that the rotational velocities of the input and output shafts are substantially equal, it sends a signal to the actuator to shift the collar from the neutral position to the high chosen gear. The control means then returns the throttle control to the operator unless it has already done so in the previous step.

It will be noted that in the preferred system, for safety reasons, the control means can never increase throttle or increase the engine speed. After the operator makes the decision to shift the gears of the auxiliary transmission, the operator fully depresses the throttle. During the shifting sequence, the control means will deactivate and activate the throttle as needed. However, if the operator removes his/her foot from the throttle pedal, the control means is unable to increase throttle or increase engine speed beyond the throttle position held by the operator; only the operator can increase engine speed. However, a control means could be developed to increase throttle without operator interface and still fall within the scope of the invention.

In the event that the rotational velocity of the input shaft is permitted to increase to a value substantially greater than the rotational velocity of the output shaft (i.e., the control means overshoots the rotational velocity of the output shaft), the control means deactivates the throttle until the rotational velocity of the input shaft drops down to substantially equal that of the output shaft. In contrast, if the rotational velocity of the input shaft is permitted to drop below the rotational velocity of the output shaft, the control means will reactivate the throttle to increase the input shaft speed until it substantially equals or matches that of the output shaft.

It is therefore an object of the present invention to provide a system for shifting the multi-speed gearbox of an auxiliary transmission while the vehicle is moving and without the need for a drive-line clutch.

Another object of the present invention is to provide a system for shifting an auxiliary transmission without gear synchronizers.

Another object of the present invention is to provide an easy-to-use shifting system for an auxiliary transmission with visual indication of which gear range is in use.

Another object of the present invention is to provide a shifting system for an auxiliary transmission with a built-in safety device that will not permit the shift collar to move off of a gear into neutral when the vehicle is traveling above a prescribed speed.

Yet another object of the present invention is to provide an operator warning signal in the event a shift is requested during an unsafe condition or when a gear is not fully engaged.

Yet another object of the present invention is to provide an electronic circuit that controls the engine speed, the main transmission forward clutch and auxiliary transmission shift fork to provide clutchless shifting of an auxiliary transmission while the vehicle is moving.

BRIEF DESCRIPTION OF THE DRAWINGS

This invention is illustrated more or less diagrammatically in the accompanying drawings, wherein.

DETAILED DESCRIPTION OF THE INVENTION

Like reference numerals will be used to refer to like or similar parts from Figure to Figure in the following description of the drawings.

The dramatic improvement contributed by the present invention is best understood after consideration of how conventional auxiliary transmissions are shifted when the vehicle is equipped with an automatic main transmission. After making the decision to shift the auxiliary transmission, the operator must slow the vehicle down to a complete stop before shifting from either a low gear to a higher gear or high gear to a lower gear. Further, most auxiliary transmissions can only be shifted in transit in combination with the main transmission that includes a drive-line clutch. Therefore, most conventional auxiliary transmissions cannot be shifted in transit in combination with an automatic main transmission. The present invention, provides for clutchless shifting of an auxiliary transmission while the vehicle is moving and therefore enables in-transit shifting of an auxiliary transmission that can be used in conjunction with a fully automatic main transmission.

Figure 1:
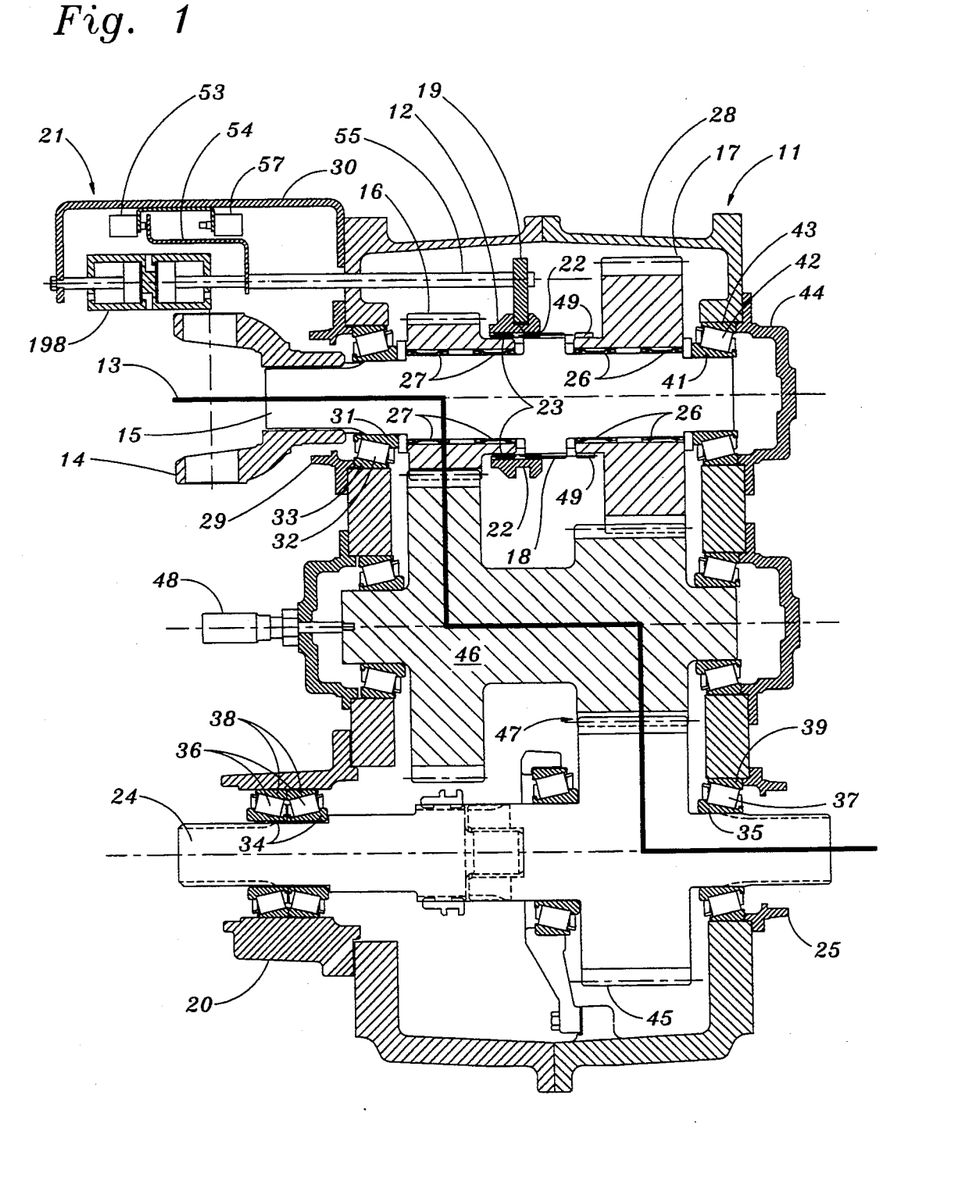
FIG. 1 is a sectional view of a transfer case of an auxiliary transmission used in connection with the present invention, the transfer case is shown in low range.
Figure 2:
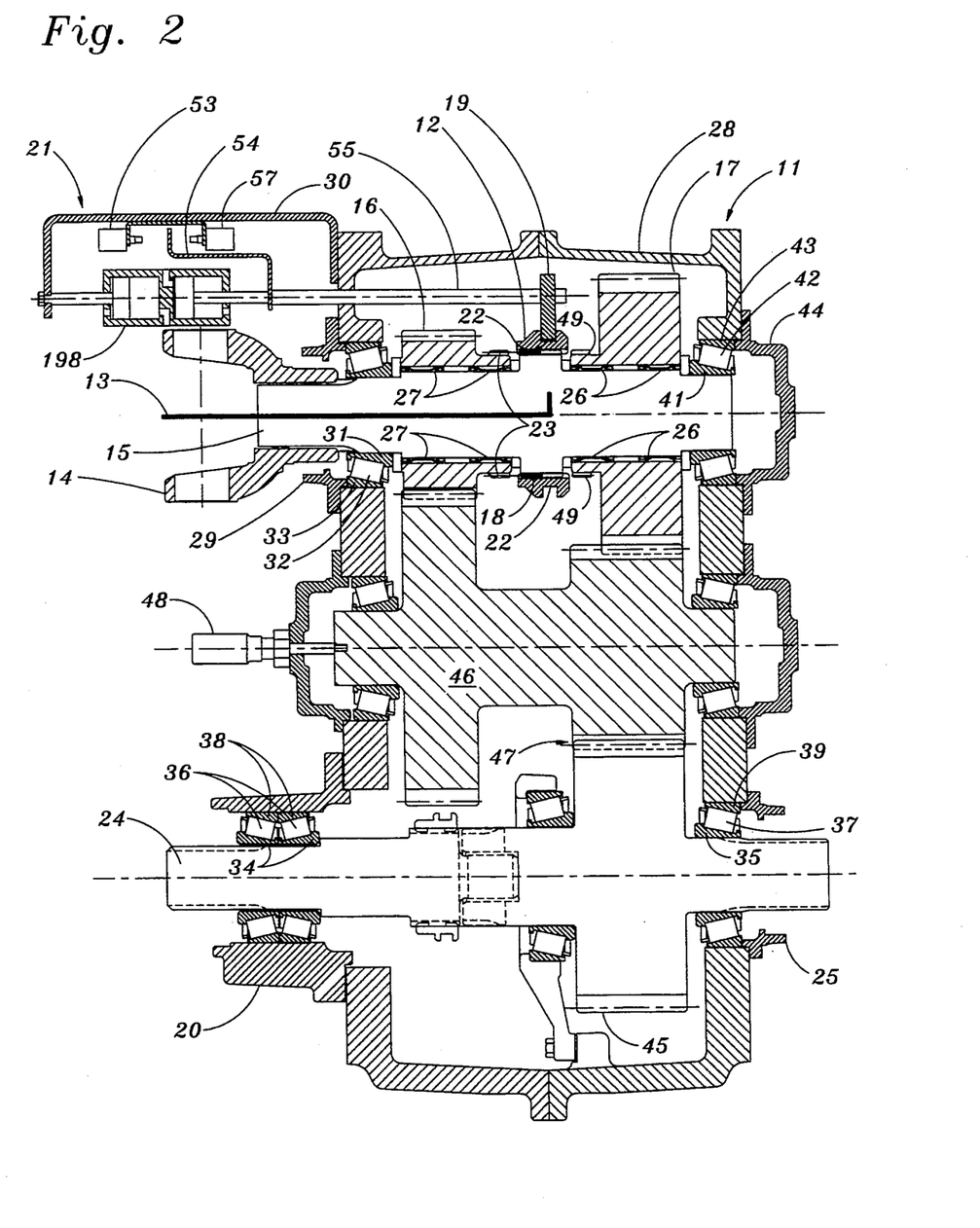
FIG. 2 is a sectional view of the transfer case shown in FIG. 1, the transfer case is shown in neutral position.
Figure 3:
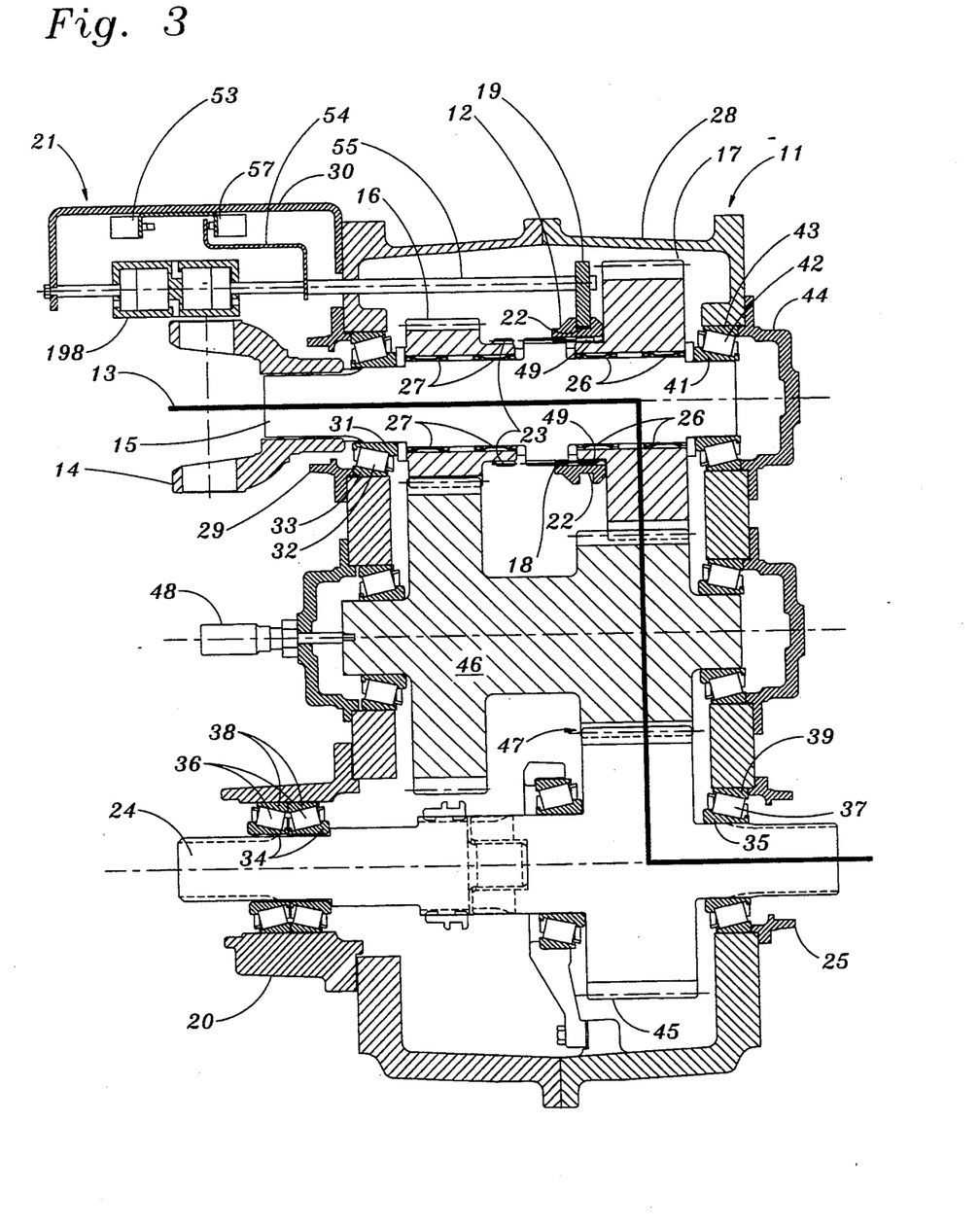
FIG. 3 is yet another sectional view of the transfer case shown in FIG. 1, the transfer case is shown in high range.

Turning to FIG. 1, a two-speed transfer case 11 of an auxiliary transmission is shown for purposes of illustrating how the present invention operates. It will be noted that the present invention is not limited to a two-speed auxiliary transmission but is applicable to all multi-speed auxiliary transmissions. The shift collar 12 is shown in the low position. As illustrated by the power transmittal path line 13, power is transmitted from the power input shaft (not shown) through the input yoke 14 to the input shaft 15 which passes through the low range drive gear, shown generally at 16, and through the high range drive gear, shown generally at 17. The input shaft 15 includes splines 18 which slideably connect the shaft 15 to the shift collar 12. The shift collar 12 moves between the low gear position as seen in FIG. 1, the neutral position as shown in FIG. 2 and the high gear position as shown in FIG. 3. A shift fork 19 that is controlled by an actuator 21 engages the slots 22 disposed in the exterior of the collar 12. To move the collar 12, the actuator moves the fork 19 which slides the collar 12 to the desired position. With the shift collar 12 fully engaged over the low gear splines 23 (see also FIGS. 2 and 3), the power transmittal path 13 passes through the input shaft 15, through the low range gear 16, through the intermediate shaft gear 46, through the output gear 45 and then through the output shaft 24.

With the shift collar 12 engaged over the low gear splines 23, the high gear 17 spins freely on its needle bearings, indicated at 26. Like or similar needle bearings 27 are provided for the low gear 16. The void space in the transfer case housing 28 is partially filled with fluid or oil as with any conventional gearcase.

Yokes (not shown), similar to the yoke indicated at 14, are provided on the front end and the rear end of the output shaft 24. The lateral position of the yoke 14 is maintained by the end cap 29 (see also the end cap 25 and the bearing cap 20). The end of the input shaft 15 is contained within the bearing inner race 31 which is fixedly attached to the shaft 15 and engages the bearing 32 as the inner race 31 rotates with the shaft 15. The bearing outer race 33 is disposed between the bearing 32 and the T-case housing 28. Similarly, the ends of the output shaft 24 are contained within bearing inner races 34, 35 which engage the bearings 36, 37 respectively as they rotate with the output shaft 24. Bearing outer races 38, 39 are disposed between the bearings 36, 37 and the T-case housing 28. The aft end of the input shaft 15 is also contained within a bearing inner race 41 which engages the bearing 42. A bearing outer race 43 is provided between the bearing 42 and the T-case housing 28. A bearing cap 44 encloses the aft end of the input shaft 15.

An output shaft driven gear 45 is mounted to the output shaft 24 and is rotatably connected to the intermediate shaft gear 46 via meshing gear teeth indicated generally at 47.

As noted below, the shifting system of the present invention includes two signal generators measuring the rotational velocities of the input shaft 15 and the output shaft 24. The rotational velocity of the output shaft 24 is measured by the signal generator 48. The signal generator measuring the rotational velocity of the input shaft 15 is not shown in FIG. 1.

The actuator 21 includes the double solenoid valves 51, 52 (see FIG. 6A) and duplex cylinder 198. Bracket 30 supports the actuator 21 and the limit switches 53, 57. In FIG. 1, the duplex cylinder 198 is in the low position, the shift collar 12 is disposed on the splines 23 of the low gear 16 and the low limit switch 53 has been activated by the bar 54 attached to the shiftrod 55 of the shift fork 19. The activated low limit switch 53 illuminates the low lamp 56 (see FIGS. 4, 6A) on the operator's panel telling the operator that the transmission is in low gear.

Turning to FIG. 2, the shift collar 12 has been moved off of the lower gear splines 23 and into the neutral position. The power transmittal path 13 stops with the shift collar 12 as it spins freely with the input shaft 15. The low gear 16 and high gear 17 spin freely on their needle bearings 27, 26 respectively in the neutral position. The bar 54 does not activate either the low limit switch 53 or the high limit switch 57 when the duplex cylinder 198 is in the neutral position.

Turning to FIG. 3, the shift collar 12 now completely engages the splines 49 of the higher gear 17. The power transmittal path 13 now extends through the input shaft 15, through the high range gear 17, through the intermediate shaft gear 46, through the output gear 45 and through the output shaft 24. The bar 54 engages and activates the high limit switch 57 which illuminates the high lamp 58 on the operator's panel (see FIGS. 4, 6A).

Figure 4:
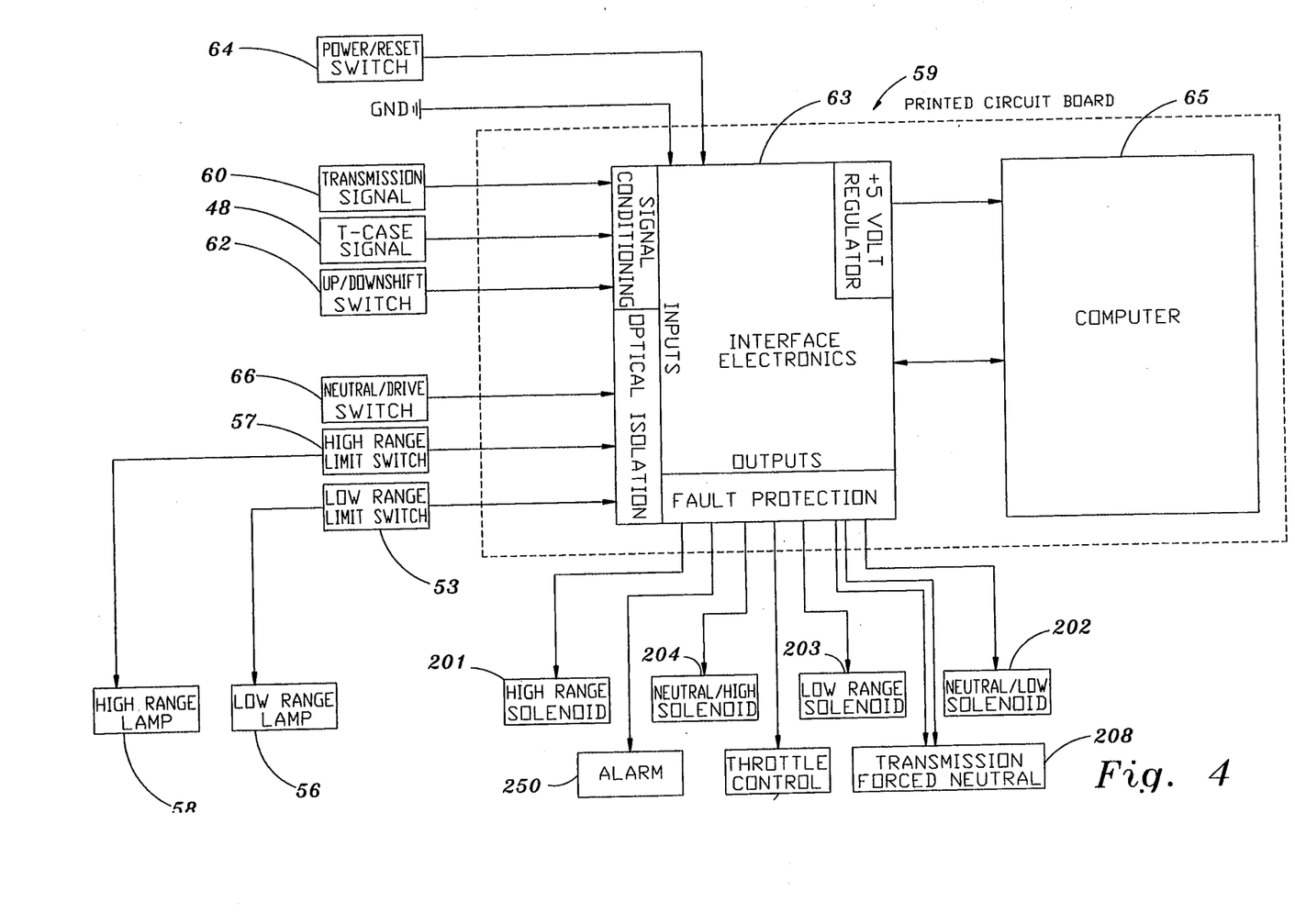
FIG. 4 is a block diagram of the shifting system of the present invention.

FIG. 4 is a block diagram of the control means 59 of the shifting system of the present invention. The rotational velocity of the input shaft is provided by the transmission signal shown at 60. The rotational velocity of the output shaft is provided from the T-case signal generated at 48 as shown in FIGS. 1, 2 and 3. The signals are continuously conditioned at 63. When the operator hits the up/downshift switch indicated at 62, an instruction is sent to the interface electronics 63 and then on to the computer 65 to either upshift or downshift the auxiliary transmission. The switch 62 initiates the electronic circuitry of the interface electronics 63 and then signals the computer 65 which immediately begins the shifting process if certain parameters governing shifting have been met as discussed below.

A second switch 64 is the power/reset switch which is on/off switch for the electronic circuitry. The switch 64 also resets the electronic circuitry if the computer 65 locks up. A third switch is the neutral/drive switch 66. The drive position is used when driving the vehicle and permits switching between the high and low range. The switch 66 only operates to shift the collar 12 to neutral (see FIG. 2) when the vehicle is stationary. The two limit switches 53, 57 (see also FIGS. 1-3) are activated when the collar 12 fully engages either the low range splines 23 of the low range gear 16 or the high range splines 49 of the high range gear 17 (See FIGS. 1-3). When the collar 12 fully engages the high range splines 49, the high range lamp 58 is illuminated. When the collar 12 fully engages the low range splines 23, the low range lamp 56 is illuminated.

Figure 5A:
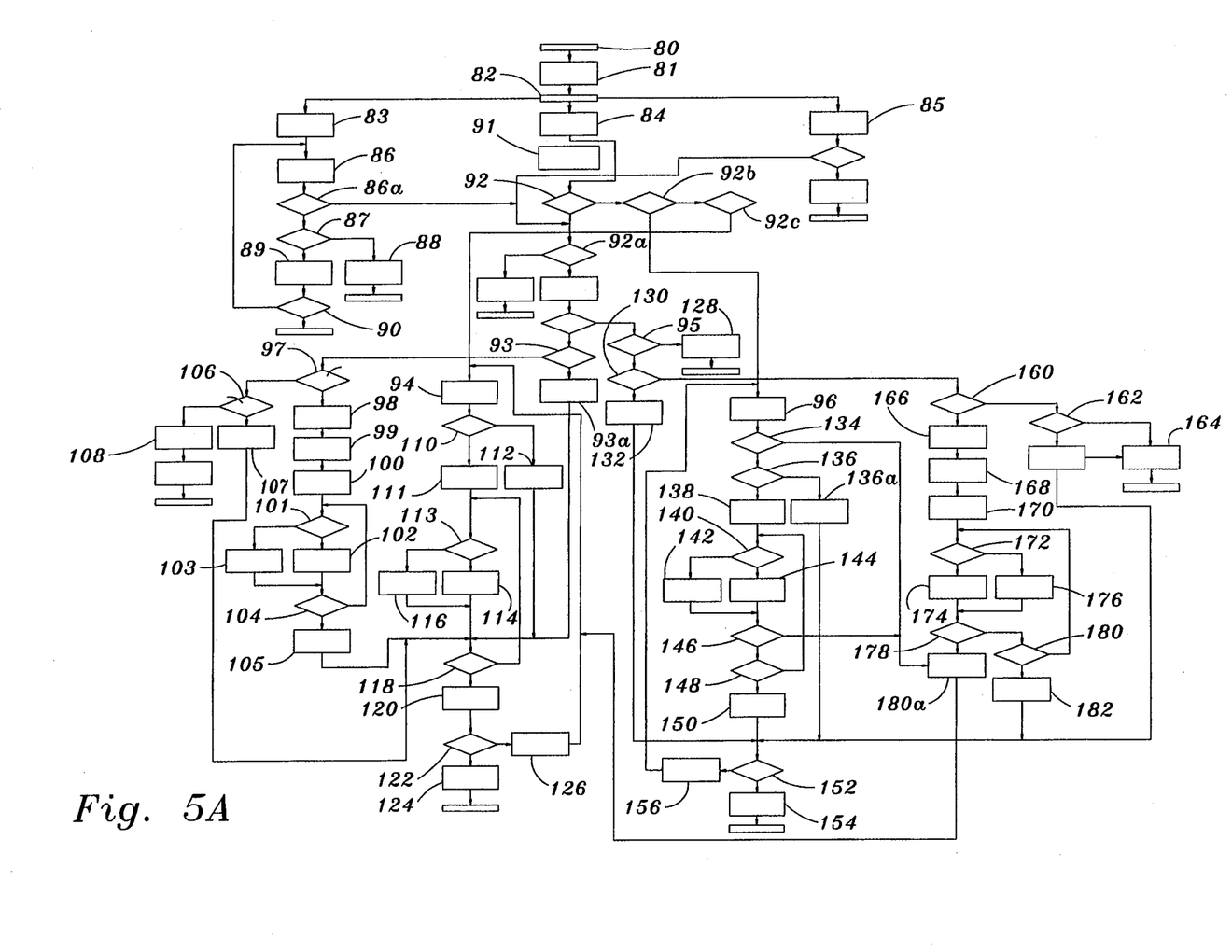
FIG. 5A is a logic flow chart of the shifting system of the present invention.
Figure 5B:
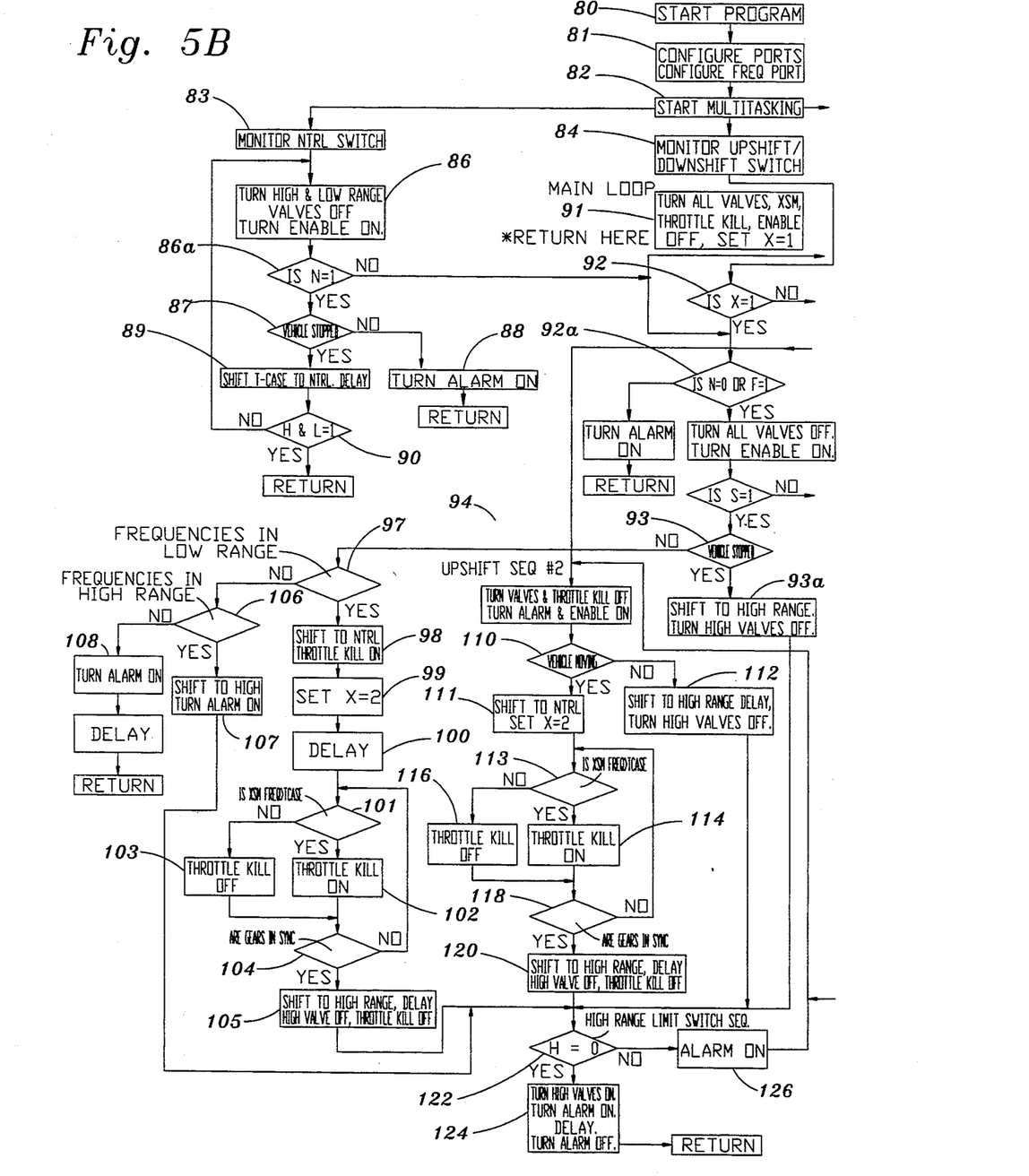
FIG. 5B is an expanded view of the left-half of the logic flow chart shown in FIG. 5A.
Figure 5C:
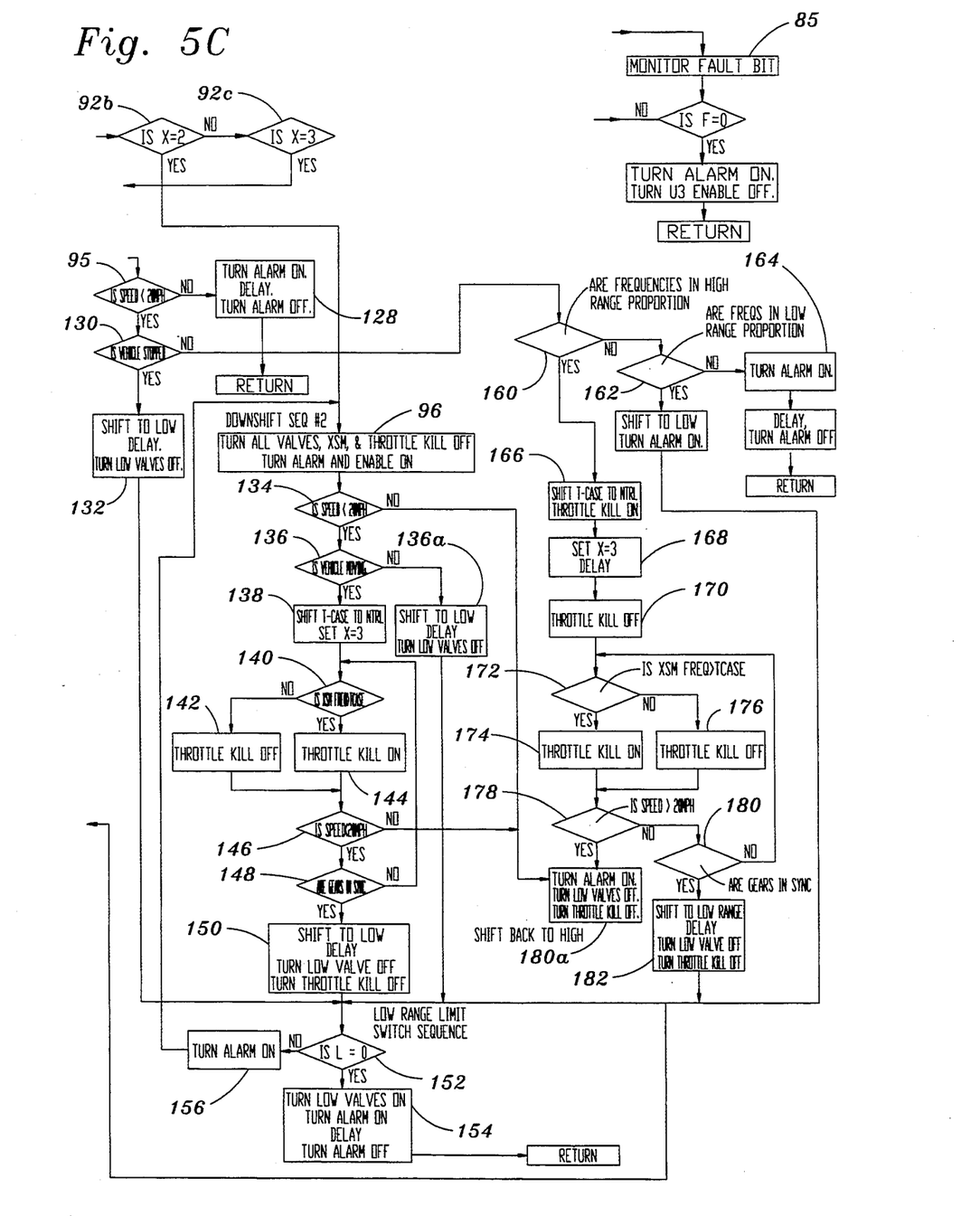
FIG. 5C is an expanded view of the right-half of the logic flow chart shown in FIG. 5A.

Turning to FIG. 5A, a logic flow diagram of the control means 59 is illustrated. It will be understood that the sequence and timing of the steps shown in FIGS. 5A through 5C may be varied without departing from the scope of the present invention. The start program step 80 is initiated when the vehicle is started or when the power/reset switch 64 (See FIG. 4) is turned on. The system is configured at 81 and the multi-tasking is commenced at 82. Contemporaneously, the neutral drive switch 66 is monitored at 83, the up/down switch 62 is monitored at 84 and the system monitors for faults at 85. The computer also samples the outputs of both frequency generators (the output frequency generator is shown at 48 in FIGS. 1-3; the input frequency generator is not shown), sets the variable X=1 at 91, turns off all solenoid valves 201, 202, 203, 204 (see FIG. 6A), ensures that the throttle is restored and ensures that the forward clutch of the main transmission is engaged. As a part of the multitasking referred to at 82, if either the up/down switch 62 or the neutral/drive switch 66 is pressed or the fault bit changes state while the computer is running a logic loop, the loop is aborted and reverts back to 82. The multitasking is a background task wherein the computer samples the specified line at each tick of the system clock, i.e. switches 62 and 66 and the fault bit for a change in logic level. A change in state causes a program branch to the specified subroutine.

If the neutral switch 66 changes logic level at 83, the high and low range valves 201, 203 are turned off at 86. If the drive/neutral switch 66 is set to neutral at 86a, the system checks to see if the vehicle is stopped at 87. If the vehicle is stopped, the collar 12 is shifted to neutral at 89. If the vehicle is not stopped at 87, the alarm is turned on at 88, and the system returns to the main program at 91 and turns all ports off. If the control means detects that the shift to neutral was not successful at 90 (i.e., the collar 12 is in low or high gear), the system will loop back to step 86.

The computer 65 monitors up/down switch 62 at step 84. The variable X is set to 1 at the beginning of the program at 91 in the main loop. The value of X is tested at 92. X is set to 2 at steps 99 and 111 during upshift sequences and X is set to 3 at steps 138 and 168 during downshift sequences. If switch 62 on the control panel is switched during a shifting sequence, the computer will check the value of X at 92 (a, b, and c) and revert to the appropriate routine.

If neutral has not been selected and no faults are present at 92a, the computer goes to the upshift sequence number one at 93, or the downshift sequence number one at 95 depending on switch 62 position.

The first upshift sequence 93 is as follows. The system checks to see if the vehicle is stopped at 93. If the vehicle is stopped at 93, the neutral/high 204 and high 201 solenoid valves are activated to shift the collar 12 into high gear at 93a. If the vehicle is not stopped at 93, the system checks to see if the vehicle is in low range by sensing the proportion of the input frequency to the output frequency at step 97. If the vehicle is in low range, three functions are accomplished at 98: (1) the neutral/high solenoid value 204 is activated to force the collar 12 towards the neutral position; (2) the forward clutch of the main transmission is deactivated; and (3) the throttle is deactivated. At this time, the collar 12 is thrown into the neutral position and the engine speed is being reduced. After a delay at 99, the forward clutch of the main transmission is reactivated at 100. The input shaft frequency and output shaft frequency are compared at 101. If the input shaft frequency is still greater than the output shaft frequency, the throttle remains deactivated or "killed" at 102. If not, the throttle is reactivated at 103. If the gears are in sync at 104, the high solenoid valve 201 is activated and the collar 12 is shifted from the neutral position to high range and the throttle is reactivated at 105. If the gears are not in sync at 104, the system reverts back to step 101.

If the vehicle is not in low range at 97, the system checks to see if the vehicle is in high range at 106. If so, an alarm is sounded and the high range valves are activated at 107. If the vehicle is neither in high at 106 nor low at 97, the alarm is sounded for a time at 108 and the program returns to the main program at 91. The alarm at 108 is an indication of an open or short circuit on one of the signal generators.

A second upshift sequence is illustrated beginning with 94. The second upshift sequence is used when (1)

the program is interrupted during an downshift and X=3 (see step 92c) or (2) when the high range limit switch 67 is not activated at 122 after an unsuccessful upshift sequence and (3) when speed >20 mph at 178, 146, or 134 during a downshift sequence.

If the vehicle is stationary at 110, the shift to high range is permitted at 112. If the vehicle is moving at 110, the shift collar 12 is moved to the neutral position at 111 by activating neutral/high solenoid valve 204. The computer then checks to see if the input shaft frequency is greater than the output frequency at 113. If the input shaft frequency is greater than the output shaft frequency, the throttle is killed at 114. If not, the throttle is reactivated at 116. If the gears are in sync at 118 (i.e. input shaft frequency substantially equals output shaft frequency), the high solenoid 201 is also activated which moves the shift collar 12 from the neutral to the high position and the throttle is reactivated at 120. If the gears are not in sync at 118, the system loops back and repeats 113, 114 and 116 as necessary. At the conclusion of the first upshift sequence 93 and the second upshift sequence 94, the system checks to see if the high range limit switch has been activated at 122. If so, the high and neutral/high actuator valves 201, 204 are pulsed one more time to ensure complete engagement of the shift collar 12 on the high range splines 49 at step 124 and then the system returns to the main program loop at 91. The alarm is activated briefly (or beeped) at 124 to indicate to the operator that the shift is completed. If the high range limit switch 57 is not activated at 122, the alarm is sounded at 126 and the upshift sequence is repeated beginning with step 94.

A first downshift sequence is illustrated beginning with step 95. If the speed is greater than 20 mph at 95, the alarm is sounded for a time at 128 and the program returns to the main program at 91. If the vehicle's speed is less than 20 mph, then the system proceeds to the step 130 to determine whether the vehicle is stopped. If the vehicle is stopped at 130, then the low and neutral low actuators or solenoids 202, 203 are activated at 132 for the simplified shifting sequence.

If the vehicle is not stopped at 130, the control means checks to see if the vehicle is in high range at 160. If the vehicle is not in high range at 160, the control means checks to see if the vehicle is in low range frequency at 162. If the vehicle is in neither high nor low range at 160 and 162, the alarm is sounded for a time at 164 and the program returns to the main program at 91.

If the vehicle is in high range at 160, the neutral/low solenoid valve 202 is activated at 166 which pushes the collar 12 toward the neutral position from its location on the high range gear 17. The throttle is killed and the forward clutch of the automatic main transmission is deactivated. As the collar 12 moves into the neutral position, the control means waits at 168 and reactivates the forward clutch of the automatic main transmission at 170. The throttle is reactivated at 170 in order to increase the rotational frequency of the input shaft 15 to accomplish the downshift. The input shaft frequency and output shaft frequency are compared at 172. If the input shaft frequency is greater than the output shaft frequency, the throttle is killed at 174. If not, the throttle is reactivated at 176. A safety check to ensure that the vehicle is not proceeding faster than 20 mph is conducted at 178. If the vehicle speed is increased to over 20 mph at 178, the alarm is sounded at 180a and the low range valves are turned off. Then the system goes back into high range sequence #2 at 94. If not, the control means checks to see if the gears are in sync at 180 and if so, activates the low solenoid 203 at 182 thereby shifting the collar 12 from the neutral position onto the low range splines 23 and returns control of the throttle to the operator. If the low range limit switch 53 has been activated at 152, the alarm beeps at 154 indicating to the operator that the downshift has been successfully completed and the actuator valves are pulsed one more time to ensure complete engagement of the shift collar 12 on the low range splines 23 at step 154 and then the system returns to the main program loop at 91.

A second downshift sequence is illustrated beginning with 96. The second downshift sequence is used when (1) the program is interrupted during an upshift and X=2 (see step 92b) or (2) when the low range limit switch 68 is not activated at 152 after an unsuccessful downshift. In the latter case, the alarm 250 will sound at 156 and the computer will "try again". The second downshift sequence first turns all valves off, restores the engine throttle, and reengages the forward clutch of the main transmission at 96, then the system rechecks to ensure that the vehicle is not going faster than 20 mph at 134. The controller then rechecks to see if the vehicle is stopped at 136. If the vehicle is stopped at 136, the shift takes place at 136a. If the vehicle is not stopped at 136, the neutral/low valve 202 is activated and the shift collar 12 is moved toward the neutral position at 138. The input and output frequencies are compared at 140. If the input frequency is less than the output frequency at 140, the throttle is reactivated at 142. If the input frequency is greater than the output frequency at 140, then the throttle remains deactivated at 144. The system, for safety reasons, double checks to ensure the vehicle is not proceeding faster than 20 mph at 146. If vehicle speed is greater than 20 mph the alarm is turned on and the low range valves are turned off at 180a. Then the system goes back to high range sequence #2 at 94. If the control means determines that the gear is in sync at 148, the low valve 203 is also activated at 150, pushing the collar 12 from the neutral position towards the lower gear 16 and the throttle is reactivated.

Figure 6A:
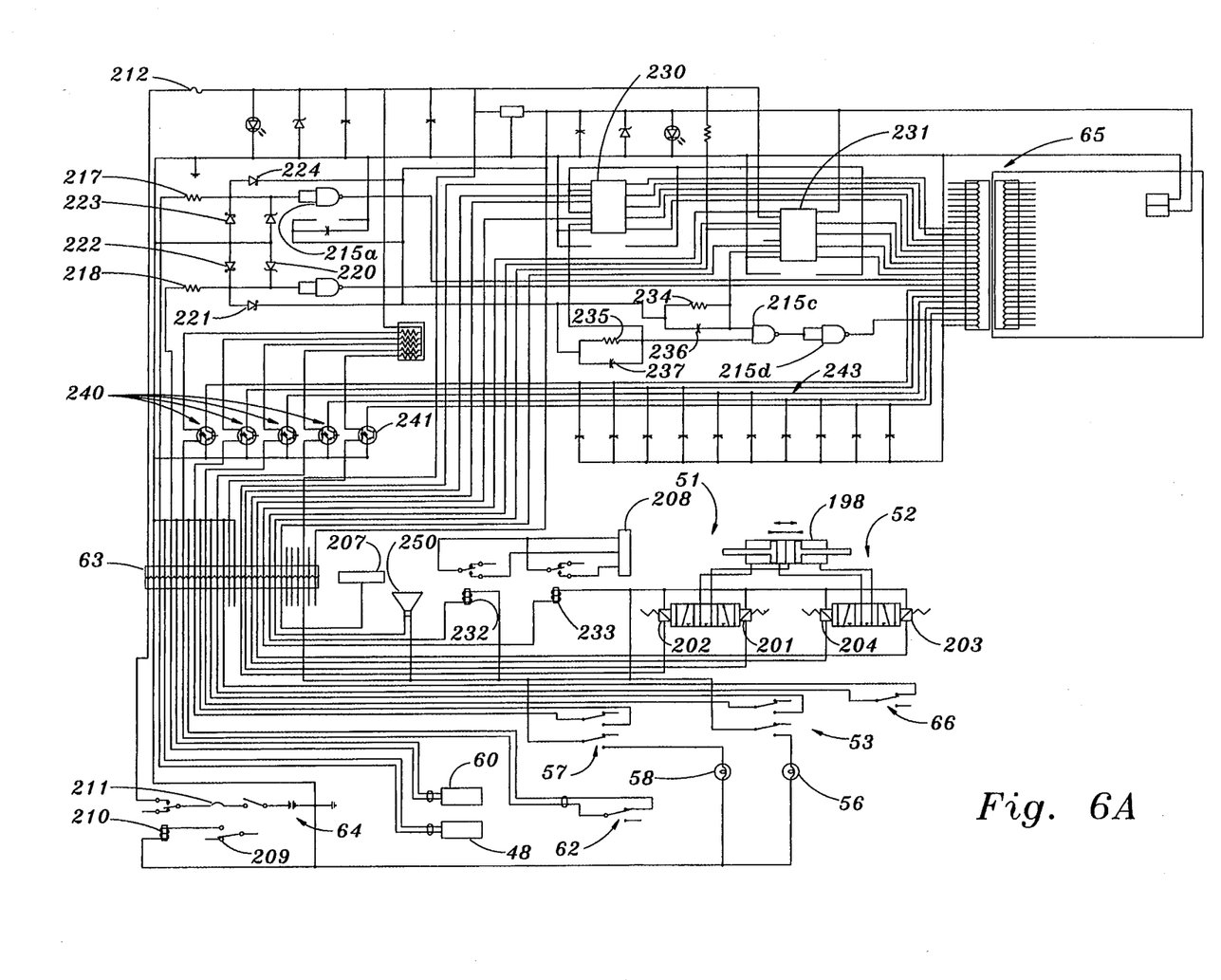
FIG. 6A is a schematic diagram of the shifting system of the present invention.
Figure 6B:
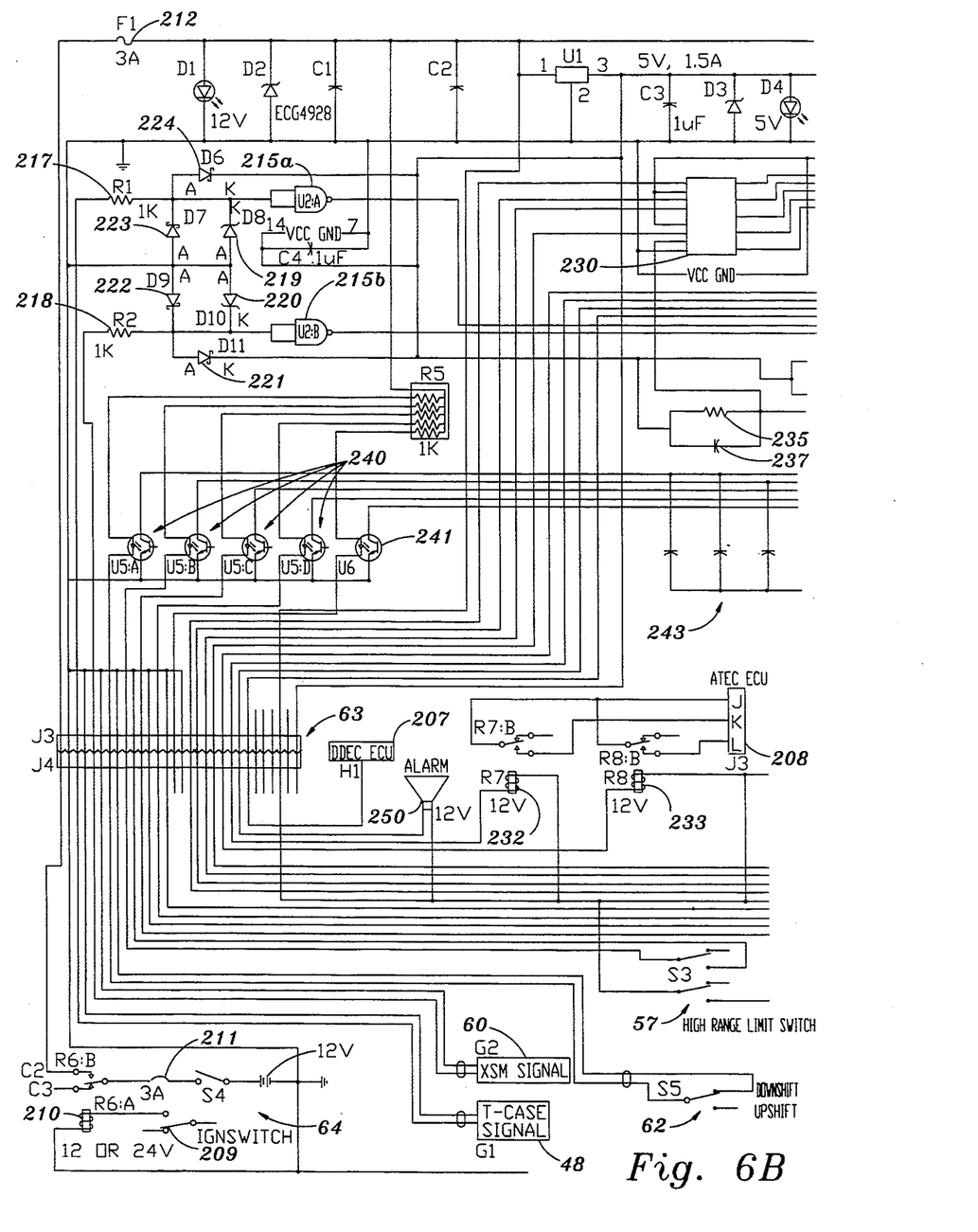
FIG. 6B is an expanded view of the top-half of the schematic diagram shown in FIG. 6A.
Figure 6C:
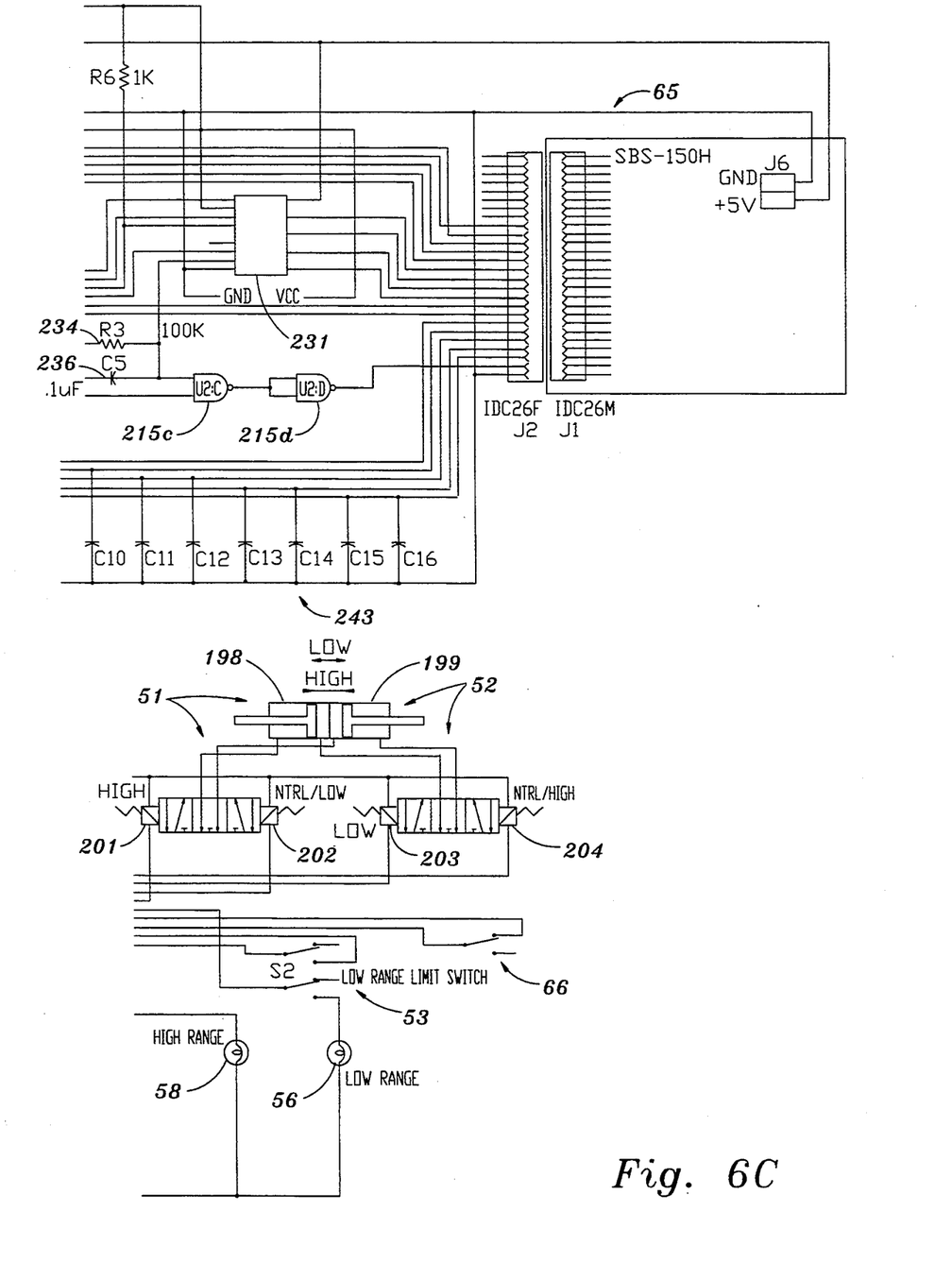
FIG. 6C is an expanded view of the lower-half of the schematic diagram shown in FIG. 6A.

An illustration of the electronic circuitry incorporated into the present invention is illustrated in FIGS. 6A, 6B and 6C.

FIG. 6A shows a schematic view of the components of the shifting system of the present invention as they relate to several mechanical components of the shifting system. The transfer case 11 (see FIGS. 1-3) carries a bracket 30 upon which a duplex cylinder 198 is mounted to the end of the transfer case shifting fork rod 55. Control of the duplex cylinder 198 is provided by the high solenoid valve 201, the neutral/high solenoid valve 204, the low solenoid valve 203 and the neutral/low solenoid valve 202. Two limit switches 53, 57 are positioned on the transfer case bracket 30 to be preferably activated by a bar 54 on the transfer case shifting fork rod 55 when the high range or low range, respectively, is fully attained.

The frequency generator 48 is mounted to the intermediate shaft 46 (see FIGS. 1-3) to sense the speed of the output shaft 24. The reader will note that the output shaft speed is always directly proportional to the vehicle ground speed. Another frequency generator 48a may be mounted to the tail shaft of the main transmission to sense the input shaft speed. An engine electronic control 207 and transmission electronic control 208 communicate with the interface electronics 63 (see also FIG. 4).

The shifting system is powered by turning on the vehicle ignition switch 209 to the run position. This energizes the coil of the relay 210, closing its contacts. When the power/reset switch 64 (see FIG. 4) is turned on to the power position, it connects 12 volts from the vehicle power supply to the electronics and computer 65 through the circuit breaker 211 and fuse 212. If the computer 65 has a glitch or malfunction and will not properly control the shifting system, the power/reset switch 64 may be turned off, then back on to reset the computer 65.

The signals from the T-case generator 48 and transmission signal generator 60 are processed at 215a and 215b, respectively before they get to the computer 65. Before the signals get to the semiconductor chip 215 which is a quad NAND Schmitt Trigger used to clean up the signals, they are processed by resistors and diodes. The resistors 217, 218 are used to attenuate the signal. The diodes 219, 220 are used to clip the signals between 5 volts and ground. The diodes 221, 222, 223 and 224 are used to suppress fast transients.

The semiconductor chips 230, 231 are intelligent-power quad low side switches. They improve the current capability for the switching of the solenoid valves 201, 202, 203 and 204, and provide the signal that controls the forward clutch of the main transmission, the engine throttle kill and the alarm. The fault outputs of the chips 230, 231 are processed by the chip 215 and 215d and are then sent to the computer 65 for monitoring. The resistors 234, 235 pull up the fault outputs. The capacitors 236, 237 are used to provide some filtering for protection against false outputs during switching. The chip shown at 240 is a quad optocoupler and the chip shown at 241 is a single optocoupler. The optocouplers 240, 241 provide noise isolation between the neutral/drive switch 66, the upshift/downshift switch 62 and the limit switches 53, 57 and the inputs of the computer 65. The resistor network shown at 242 is provided to supply power to the infrared-emitting diode at the input stage of the optocoupler. The capacitors shown at 243 provide low and high frequency filtering for the inputs to the computer.

The computer 65 is a single board computer. It has a Z80 code compatible processor, digital input/output, EEPROM for program storage, and runs at 9 MHz. Any similar single board or multiple board computer could perform as well. Also, the software for the system control can be written in CAMBASIC, C, Assembly, or any other language suitable for control systems.

In the preferred embodiment, the component shown at 207 is a Detroit Diesel Engine Controller (DDEC ECU). The software associated with the controller 207 is modified and saved in EEPROM to provide the throttle control. When the computer 65 sends a high signal to one of the inputs of the chip 231, the corresponding output sends a low signal to the engine controller 207, in effect killing the throttle. When the low signal is removed from the engine controller 207, the engine resumes normal operation under control of the operator. The engine control could be performed equally as well using a relay to provide the low signal instead of the chip shown at 231.

The transmission controller shown at 208 is preferably an Allison Transmission Electronic Controller (ATEC ECU). The software associated with the transmission controller 208 is modified and saved in EPROM to enable the forward clutch of the transmission to be disengaged or to provide forced neutral control. When the computer 65 sends a high signal to two of the inputs of chip 231, the corresponding outputs send low signals to the relays 232, 233. The relays in turn switch the ATEC digital ground to the ATEC inputs for activating the forced neutral feature. The transmission controller then commands the forward clutch within the transmission to release which forces the transmission into neutral. When the low signals are removed from the relays and in turn from the transmission controller 208, the forward clutch reengages and the transmission returns to normal operation.

In the preferred embodiment, the transmission controller 208 requires two signals for forced neutral control (forward clutch disengagement) for safety considerations. The alarm is shown at 250.

Turning back to the valves shown at 51, 52 the double solenoid valves 51, 52 are controlled by the chip 230. The double solenoid valves 51, 52 supply air pressure to shift the duplex cylinder 198 which in turn shifts the collar 12 disposed on the input shaft 15 in the transfer case 11. The neutral/high solenoid valve 204 shifts the collar 12 of transfer case 11 from the low gear 16 to the neutral position. With the neutral/high solenoid valve 204 still activated, activating the high solenoid valve 201 will complete the shift to high range. The neutral/low solenoid valve 202 shifts the collar 12 of the transfer case 11 from the high range gear 17 to neutral. With the neutral/low solenoid valve 202 still activated, activation of the low solenoid valve 203 will complete the shift to the low range gear 16.

While only a two-speed transfer case for an auxiliary transmission has been illustrated, it will be apparent to those skilled in the art that the present invention may be incorporated into auxiliary transmissions with more than two speeds. Further, while it has been assumed in the above discussion that the main transmission is fully automatic with electronic controls, the present invention may also be employed with a standard hydraulically controlled automatic transmission or manual main transmission. The present invention may be incorporated with off-road heavy-duty trucks as well as conventional recreational vehicles. In essence, the present is applicable to any machine with a gear box having two or more speeds. Finally, the control means or computer could provide more control of the throttle without requiring the operator to keep his/her foot on the throttle pedal. However, the feature discussed above, which requires the operator to keep the throttle depressed during a shifting sequence, is regarded as a safety feature because the operator maintains ultimate control of the throttle and the control means cannot increase engine speed.

Although only one preferred embodiment of the present invention has been illustrated and described, it will at once be apparent to those skilled in the art that variations may be made within the spirit and scope of the present invention. Accordingly, it is intended that the scope of the invention be limited solely by the scope of the hereafter appended claims and not by any specific wording in the foregoing description.

We claim:

1. A system for shifting gears of an auxiliary transmission of a vehicle while the vehicle is moving, the system comprising:

means for sensing a rotational velocity of an input shaft and means for transmitting a signal relative thereto to a control means, means for sensing a rotational velocity of an output shaft and means for transmitting a signal relative thereto to the control means, actuation means for shifting a shift collar from a first low gear to a neutral position, from the neutral position to a first high gear, from the first high gear to the neutral position and from the neutral position to the first low gear, control means including means for comparing the rotational velocities of the input and output shafts to determine a difference in the rotational velocities of the input and output shafts, means for activating a throttle to increase the rotational velocity of the input shaft to approximate the rotational velocity of the output shaft in order to shift the shift collar from the first high gear to the neutral position to the first low gear, means for deactivating the throttle to reduce the rotational velocity of the input shaft to approximate the rotational velocity of the output shaft in order to shift the shift collar from the first low gear to the neutral position to the first high gear, limit means preventing the shifting of the shift collar from the first high gear to the neutral position when the rotational velocity of the output shaft speed is above a first preset value.

2. The system of claim 1, wherein the control means also includes an alarm means to notify an operator of the vehicle when the rotational velocity of the output shaft is above the first preset value, the control means preventing a shifting of the shift collar from the first high gear to the neutral position when the rotational velocity of the output shaft is above the first present value.

3. The system of claim 2, wherein the control means further includes means for deactivating the forward clutch of a main transmission.

4. The system of claim 3, wherein control means includes means to control the forward clutch of the main transmission while shifting the shift collar from the first low gear to the neutral position and from the first high gear to the neutral position.

5. The system of claim 4, wherein the control means communicates with a control panel visible to the operator, the control panel including at least one switch having at least one low gear selection switch, at least one high gear selection switch and at least one on/off switch.

6. The system of claim 5, wherein the system includes a plurality of limit switches, at least one limit switch for each gear, a limit switch being activated when its corresponding gear is fully engaged by the shift collar, an activated limit switch sending a signal to the control panel to illuminate an indicator light indicating to the operator that the chosen gear has been fully engaged by the shift collar.

7. The system of claim 6, wherein the limit means precludes the shifting of the shift collar from the first high gear to the neutral position when the vehicle is travelling in excess of 20 miles per hour.

8. A system for shifting gears of an auxiliary transmission of a multi-speed gear case of a vehicle while the vehicle is moving, the vehicle including a main transmission, a throttle and a forward clutch, the system comprising:

an input shaft, the input shaft passing through at least one low gear and at least one high gear, an input shaft sensor for sensing rotational speed of the input shaft, an output shaft, an output shaft sensor for sensing the rotational speed of the output shaft, collar means for transmitting power between the input shaft and the output shaft, the collar means providing at least three power transmittal paths including a first path from the input shaft through the low gear to the output shaft and a second path from the input shaft through the high gear to the output shaft and a third path from the input shaft to the collar means when the collar means is in a neutral position and unengaged with the output shaft, an actuation means to move the collar means between the high gear and the neutral position and between the low gear and neutral position, control means for actuating shifting of the gears of the auxiliary transmission upon command from an operator, the control means including means for receiving signals from the input and output shaft sensors and means for comparing the signals from the input and output shaft sensors, the control means also including means for deactivating and reactivating the throttle to increase and decrease the rotational speed of the input shaft, the control means receiving a communication from the operator instructing the control means to shift gears from an engaged gear to a chosen gear, the control means sending a signal to the actuation means to move the collar means to the neutral position from the engaged gear, the actuation means moving the collar means to the neutral position, the control means thereafter sending a signal to deactivate or activate the throttle to increase or decrease the rotational velocity of the input shaft until the rotational velocities of the input and output shafts are substantially equal, the control means sending a signal to the actuation means to move the collar to the chosen gear.

9. The system of claim 8, wherein the control means further includes means for disengaging the forward clutch of the main transmission.

10. The system of claim 9, wherein the control means includes means to disengage the forward clutch of a main transmission prior to shifting the shift collar from the first low gear to the neutral position and from the first high gear to the neutral position.

11. The system of claim 10, wherein the operator must fully depress the throttle after sending the command to the control means to shift gears and the operator maintains the throttle in a fully depressed position until the shift is complete, the control means deactivating the throttle to reduce the rotational velocity of the input shaft, the control means being unable to increase the rotational velocity of the input shaft with the operator fully depressing the throttle.

* * * * *